United States Patent
Azizi et al.

(10) Patent No.: US 9,451,638 B2
(45) Date of Patent: Sep. 20, 2016

(54) METHODS, WIRELESS COMMUNICATION STATIONS, AND SYSTEM FOR DEVICE COEXISTENCE IN THE 5 GHZ FREQUENCY BAND

(71) Applicant: Intel Corporation, Santa Clara, CA (US)

(72) Inventors: Shahrnaz Azizi, Cupertino, CA (US); Thomas J. Kenney, Portland, OR (US); Eldad Perahia, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 14/127,417

(22) PCT Filed: Sep. 26, 2013

(86) PCT No.: PCT/US2013/061999
§ 371 (c)(1),
(2) Date: Dec. 18, 2013

(87) PCT Pub. No.: WO2014/182329
PCT Pub. Date: Nov. 13, 2014

(65) Prior Publication Data
US 2016/0073430 A1    Mar. 10, 2016

Related U.S. Application Data

(60) Provisional application No. 61/821,023, filed on May 8, 2013.

(51) Int. Cl.
*H04W 74/08* (2009.01)
*H04W 84/12* (2009.01)

(52) U.S. Cl.
CPC ......... *H04W 74/0825* (2013.01); *H04W 84/12* (2013.01)

(58) Field of Classification Search
CPC .. H04W 4/00; H04W 74/0825; H04W 84/12
See application file for complete search history.

(56) References Cited

U.S. PATENT DOCUMENTS

| | | |
|---|---|---|
| 2005/0180386 A1 | 8/2005 | Hansen et al. |
| 2007/0291862 A1 | 12/2007 | Mehta |

(Continued)

FOREIGN PATENT DOCUMENTS

| | | |
|---|---|---|
| CN | 104380821 A | 2/2015 |
| EP | 1039655 B1 | 2/2011 |

(Continued)

OTHER PUBLICATIONS

"Russian Application Serial No. 2014152251, Office Action mailed Jun. 23, 2015", w/ English Translation, 13 pgs.

(Continued)

*Primary Examiner* — Christopher Grey
(74) *Attorney, Agent, or Firm* — Schwegman Lundberg & Woessner, P.A.

(57) ABSTRACT

Embodiments of a user station (STA) and methods for operating in a wireless communication network are generally described herein. In some embodiments, a STA separates a signal, into subchannels. The signal may be received on a wireless communication channel. The STA may detect a Short Training Sequence (STS) portion of a data packet on a subchannel of the subchannels. The STA may apply a coexistence technique, such as refraining from transmitting STA transmissions, on the channel responsive to the detecting.

14 Claims, 4 Drawing Sheets

(56) References Cited

U.S. PATENT DOCUMENTS

| | | | |
|---|---|---|---|
| 2008/0240267 A1* | 10/2008 | Hassan | H04W 72/08 375/260 |
| 2008/0240275 A1* | 10/2008 | Cai | H04L 5/007 375/260 |
| 2011/0317674 A1 | 12/2011 | Park et al. | |

FOREIGN PATENT DOCUMENTS

| | | |
|---|---|---|
| RU | 2264050 C2 | 11/2005 |
| WO | WO-02071627 A2 | 9/2002 |
| WO | WO-2010013897 A2 | 2/2010 |
| WO | WO-2012006035 A2 | 1/2012 |
| WO | WO-2014182329 A1 | 11/2014 |

OTHER PUBLICATIONS

"International Application Serial No. PCT/US2013/061999, International Search Report mailed Feb. 28, 2014", 3 pgs.

"International Application Serial No. PCT/US2013/061999, Written Opinion mailed Feb. 28, 2014", 7 pgs.

"IEEE Standard for Information technology—Local and metropolitan area networks—Specific requirements", 802.11p-2010,—Part 11: Wireless LAN Medium Access Control (MAC) and Physical Layer (PHY) Specifications Amendment 6: Wireless Access in Vehicular Environments, IEEE, (Jul. 23, 2010), 20-35.

"Indian Application Serial No. 5780/CHENP/2015, Voluntary Amendment filed Feb. 19, 2016", 15 pgs.

"Japanese Application Serial No. 2015-518661, Office Action mailed Feb. 9, 2016", 11 pgs.

* cited by examiner

METHODS, WIRELESS COMMUNICATION STATIONS, AND SYSTEM FOR DEVICE COEXISTENCE IN THE 5 GHZ FREQUENCY BAND

PRIORITY CLAIM

This application is a U.S. National Stage Application under 35 U.S.C. 371 from International Application No. PCT/US2013/061999, filed Sep. 26, 2013, and claims priority to U.S. Provisional Patent Application No. 61/821,023, filed on May 8, 2013, which applications are incorporated herein by reference in their entirety.

TECHNICAL FIELD

Embodiments pertain to communication networks. Some embodiments pertain to coexistence techniques for devices that operate in accordance with one of the IEEE 802.11 standards, including the IEEE 802.11n and IEEE 802.11 ac standards.

BACKGROUND

Recently, the Federal Communications Commission (FCC) has proposed modifications of the existing rules governing Unlicensed-National Information Infrastructure (U-NII) to allow shared access for U-NII devices on some sub-bands of the 5 GHz frequency band. Wi-Fi devices operating according to a standard from an IEEE 802.11 wireless standards family may expand their operating bands to take advantage of these expansion bands. However, Wi-Fi devices may need to coexist with governmental or other types of incumbent devices that may have precedence in the expansion bands.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
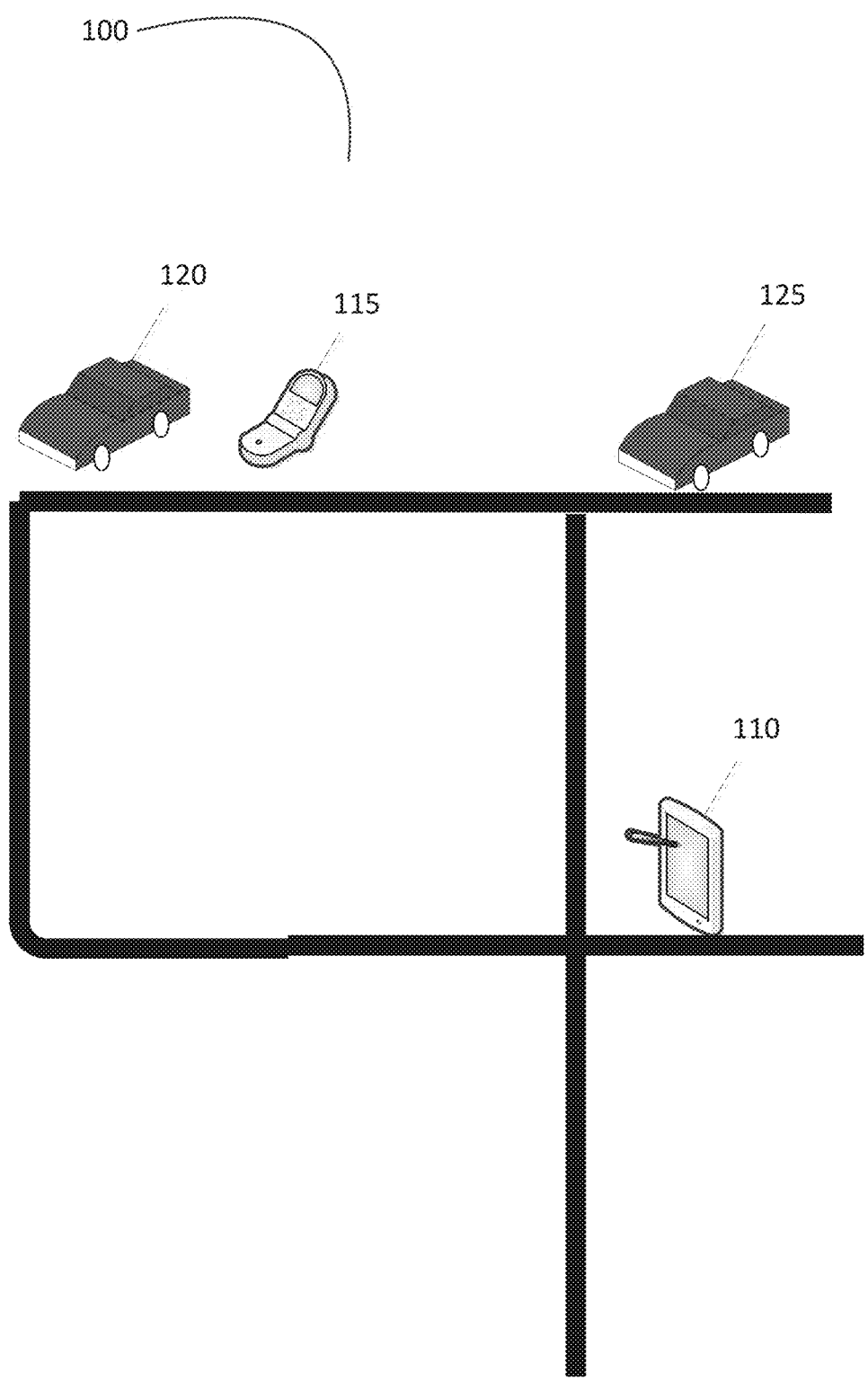
FIG. 1 illustrates a system in which example embodiments are implemented.

FIG. 1 illustrates a system 100 in which example embodiments may be implemented. The system 100 includes user wireless communication stations (STAs) 110 and 115 that operate in accordance with a standard of the Institute of Electrical and Electronics Engineers (IEEE) 802.11 family of wireless standards including the IEEE 802.11n and the IEEE 802.11ac standards. The user STAs 110 and 115 may be, for example, laptop computers, smart phones, tablet computers, printers, or any other wireless device with or without a user interface.

Current IEEE 802.11n/ac devices such as the user STAs 110 and 115 may operate on certain sub-bands of the 5 GHz frequency band. Recently, the Federal Communications Commission (FCC) has proposed modification of the existing rules governing U-NII (Unlicensed-National Information Infrastructure) use of the 5 GHz frequency band by which 195 MHz of additional spectrum is allocated for U-NII shared access in the 5350-5470 MHz and 5850-5925 MHz sub-bands of the 5 GHz frequency band.

Several governmental agencies currently use the two aforementioned 5 GHz expansion bands. Non-governmental uses include fixed satellite uplinks (Earth-to-space) and mobile services. The non-governmental mobile service allocation is currently limited to systems such as systems 120 and 125 operating in the Intelligent Transportation System (ITS) radio service. The IEEE 802.11p amendment specifies enhancements to 802.11 to support ITS applications. The FCC may require that user STAs 110 and 115 desiring to operate in these or other sub-bands of the 5 GHz frequency band implement situation-aware spectrum-sharing technologies to co-exist with IEEE 802.11p devices such as systems 120 and 125.

IEEE 802.11p devices may operate over 5 MHz, 10 MHz, and 20 MHz bandwidths. However, some IEEE 802.11n/ac devices, such as user STAs 110 and 115 may operate only at bandwidths of 20 MHz or greater. Accordingly, current 802.11n/ac devices may be unable to detect IEEE 802.11p devices operating with 5 or 10 MHz bandwidths. Some embodiments provide methods for 802.11n/ac devices, including user STAs 110 and 115, to detect signals from IEEE 802.11p devices such as devices 120 and 125. Upon detecting IEEE 802.11p devices, the user STAs 110 and 115 apply coexistence techniques to at least avoid interference with devices IEEE 802.11p devices such as devices 120 and 125. For example, user STAs 110 may refrain from transmitting on the channel or move to another channel to avoid any possible interference.

In some embodiments, the user STA 110 detects IEEE 802.11a/n/ac/p/ah orthogonal frequency division multiplexed (OFDM) packets, such as an IEEE 802.11p packet transmitted by the devices 120 or 125, by detecting a Short Training Sequence (STS) portion of the packet's preamble. The STS is the repeated sequence used in the Short Training Field (STF) portion of the preamble. The user STA 110 can detect the STS transmitted at 5 MHz or 10 MHz bandwidths because the OFDM waveforms of these bandwidths have been designed to be similar to OFDM waveforms for 20 MHz bandwidths already supported by the user STA 110. For example, the OFDM waveform for 5 MHz and 10 MHz bandwidths is created using a 64 point Fast Fourier Transform (FFT), as has been the case for OFDM waveforms at 20 MHz bandwidths. Accordingly, based on knowledge of the structure of the STS portion of an OFDM packet preamble, and based on knowledge of the OFDM waveform for 10 MHz or 5 MHz transmissions, the user STA 110 may detect transmissions as described below with respect to FIG. 2.

Figure 2:
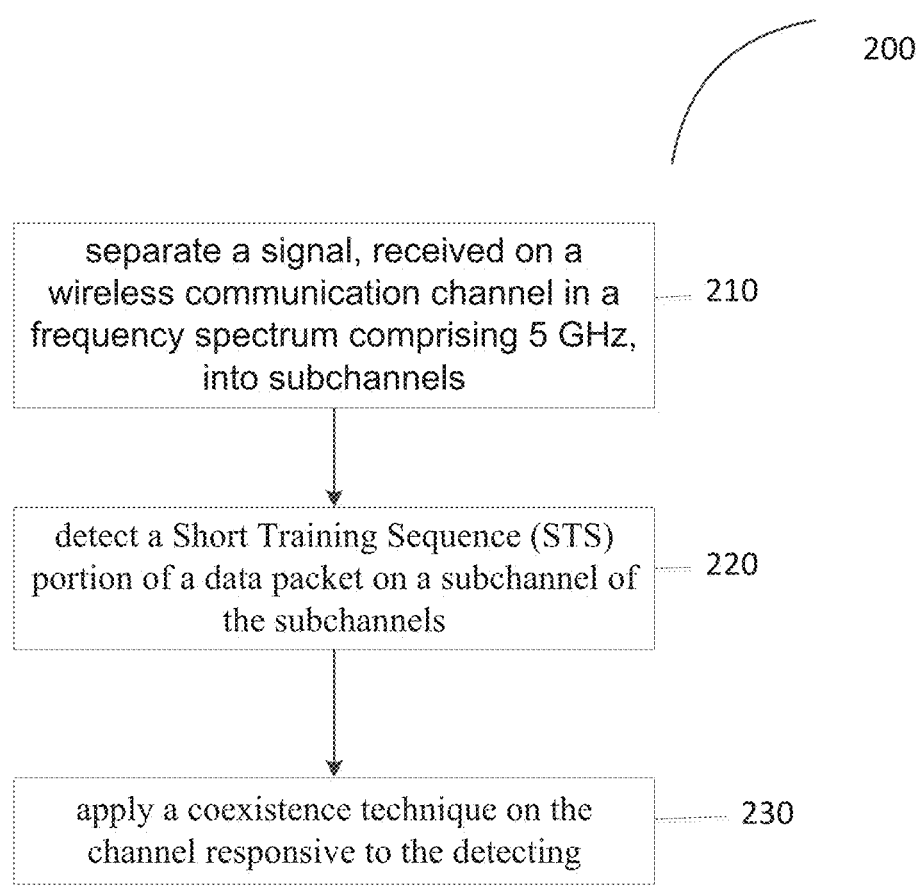
FIG. 2 is a flow diagram of a procedure performed by a user station (STA) for operating in a wireless network, in accordance with some embodiments.

FIG. 2 is a flow diagram of a procedure 200 performed by a user station (STA) for operating in a wireless network, in accordance with some embodiments. The procedure may be performed by, for example, the user STA 110 or 115 (FIG. 1).

In operation 210, the user STA 110 may separate a signal, received on a wireless communication channel, into subchannels. The bandwidth of these subchannels may be based on the expected bandwidth of transmissions of a device operating on a 5 GHz transmission band. The frequency of the transmissions may be in a frequency range from about 5.85 GHz to 5.925 GHz, or from about 5.350 GHz to 5.470 GHZ, in accordance with a standard of the IEEE 802.11 family of standards. However, embodiments are not limited to detection of transmissions in these frequency ranges.

For example, devices such as devices 120 and 125 (FIG. 1) operating in accordance with the IEEE 802.11p amendment to the 802.11 standard may operate with 5 MHz, 10 MHz and 20 MHz channel bandwidths on the 5 GHz frequency band. Accordingly, operation 210 may separate the channel into subchannels having one or more of these bandwidths, though example embodiments are not limited thereto. In some embodiments, the separating may include filtering the received signal into a subset of 5 MHz subchannels and a second subset of 10 MHz subchannels. Some embodiments may further include filtering into one 20 MHz channel. However, example embodiments are not limited thereto.

In operation 220, the user STA 110 may detect a Short Training Sequence (STS) portion of a data packet on one subchannel of the subchannels. The STS portion can be detected by inspecting the subchannels, in parallel, for a time duration based on the periodicity of the STS portion at that bandwidth. The inspection of each subchannel may proceed according to correlation algorithms described above, such that if an STS portion is detected in one of the subchannels, a correlation level, calculated according to a correlation algorithm, may meet or exceed a threshold.

Some user STAs 110 may include receivers that implement algorithms to detect STS portions based on known periodicities of the STS portion. For example, some user STA 110 receivers for receiving 20 MHz signals may perform a correlation algorithm based on the fact that STS fields repeat for a total of ten times, in accordance with standards of the IEEE 802.11 standards, every 0.8 microseconds at the 20 MHz bandwidth. User STAs 110 may calculate a moving average, therefore, over ten time periods for a total of 8 microseconds for 20 MHz transmissions, to detect whether a correlation meets or exceeds a selectable detection threshold.

In some embodiments, the user STA 110 receiver may perform filtering of the 20 MHz bandwidth into two 10 MHz subchannels, into four 5 MHz channels, or into some combination thereof. Based on the aforementioned knowledge of periodicity and timing for STS portions, the user STA 110 may then inspect the subchannels, in parallel, for a time duration, based on a periodicity of the STS portion, to detect the STS portion. In the example described above for 20 MHz signals, the user STA 110 receiver performs delay and correlation algorithms for at least 1.6 microseconds, or at least two STS sequences before an STS can be detected. In some embodiments that filter the 20 MHz bandwidth into two 10 MHz subchannels, the user STA 110 receiver performs delay and correlation algorithms for at least 3.2 microseconds before an STS can be detected using the 10 MHz filters. In some embodiments that filter the 20 MHz bandwidth into four 5 MHz subchannels, the user STA 110 receiver performs delay and correlation algorithms for at least 6.4 microseconds before an STS can be detected using the 5 MHz filters.

A user STA 110 receiver may further implement a 20 MHz correlator in parallel, so that if the 20 MHz correlator detects the STS, the user STA 110 receiver may terminate further inspection of the other filters. In at least these embodiments, the detection may be performed more quickly, though at a lower power level such that noise or other interference may affect the accuracy of the detection.

In some embodiments for which the user STA 110 suppresses transmission or operations based on the detecting, the user STA 110 may include a bank of 5 MHz filters and detectors or a bank of 10 MHz filters and detectors, with no 20 MHz correlator. In these and other embodiments, suppressing may include waiting a time duration for silence on the channel.

In some embodiments for which the user STA 110 performs other operations on the expansion bands, the user STA 110 may implement the 20 MHz correlator. In these and other embodiments, the user STA 110 may include the 10 MHz filters or the 5 MHz filters, or both the 10 MHz filters and the 5 MHz filters.

In operation 230, the user STA 110 may implement coexistence techniques if a correlation algorithm as described above detects an STS portion of an OFDM preamble on one of the subchannels. The user STA 110 may implement coexistence techniques to avoid interfering with device 120 or 125 on the 5 GHz frequency band. For example, user STAs 110 may refrain from transmitting on the channel or move to another channel to avoid any possible interference.

Figure 3:
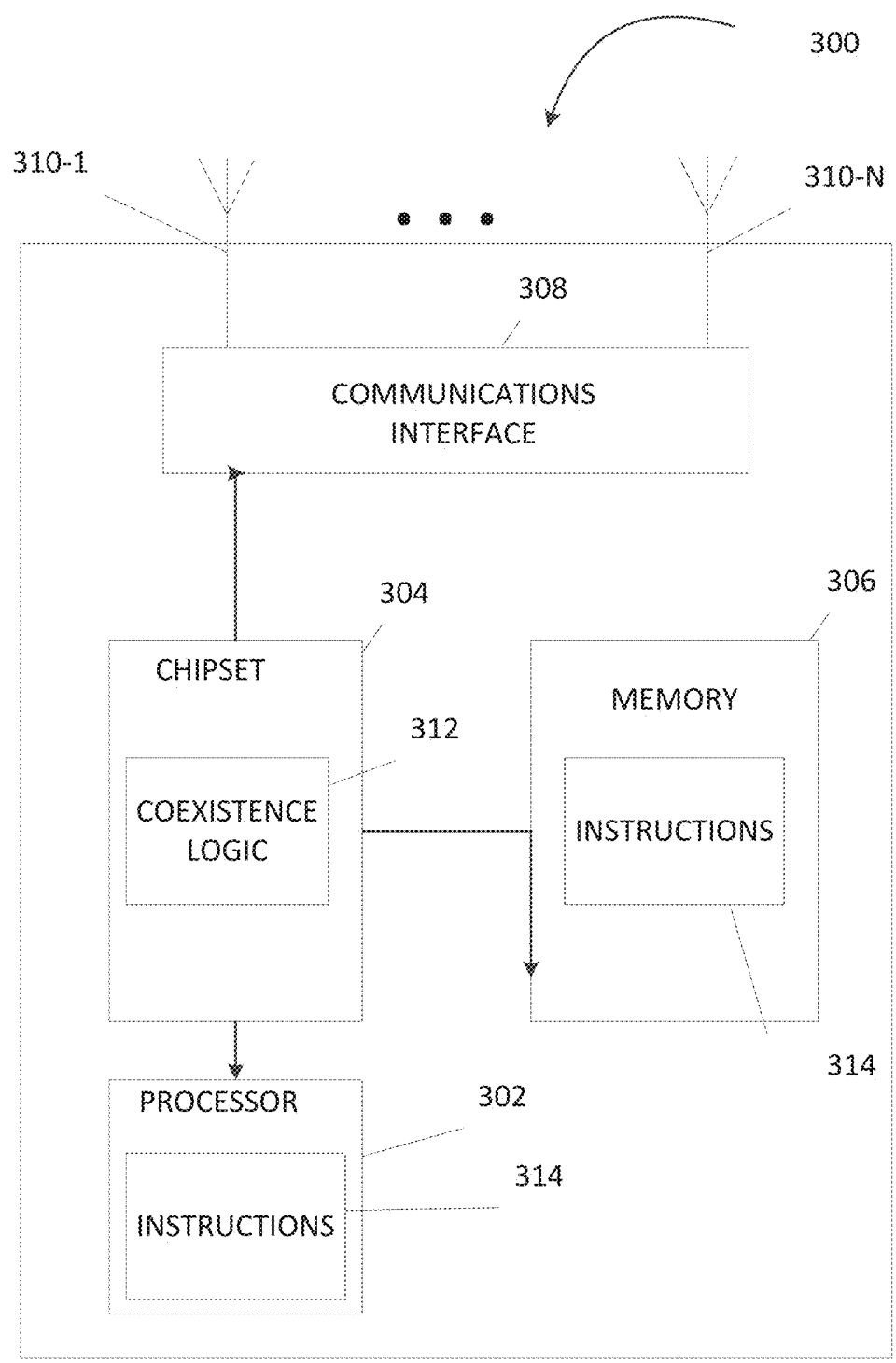
FIG. 3 illustrates a functional block diagram of a communication station (STA), in accordance with some embodiments.

FIG. 3 illustrates a functional block diagram of a STA 300, in accordance with some embodiments. The STA 300 may be suitable as a user STA 110 (FIG. 1). The STA 300 may support methods for operating in a wireless communication network, in accordance with embodiments. The user STA 300 may be configured to communicate in accordance with a standard of the IEEE 802.11n family of standards or with a standard of the IEEE 802.11ac family of standards.

The user STA 300 may include a processor 302, which uses a chipset 304 to access on-chip state memory 306, as well as a communications interface 308. In one embodiment the memory 306 includes, but is not limited to, random access memory (RAM), dynamic RAM (DRAM), static RAM (SRAM), synchronous DRAM (SDRAM), double data rate (DDR) SDRAM (DDR-SDRAM), or any device capable of supporting high-speed buffering of data.

In at least one embodiment, the communications interface 308 is, for example, a wireless Physical Layer (PHY), which operates according to a multiple input/multiple output (MIMO) operation. The communications interface 308 may be configured to receive a signal on a wireless communication channel in the 5 GHz band.

The chipset 304 may incorporate therein coexistence logic 312 to, for example, suppress transmission on the wideband communication channel for at least a time duration. In an embodiment, the chipset 304 provides MAC layer functionality.

Embodiments may be implemented in one or a combination of hardware, firmware and software. Embodiments may also be implemented as instructions 314 stored on a non-transitory computer-readable storage device, which may be read and executed by at least one processor 302 to perform the operations described herein.

The processor 302 may be arranged to separate the signal into a number of subchannels as described above with respect to FIG. 2. The number of subchannels may be based on an expected bandwidth of transmissions of a device operating in accordance with a standard of the IEEE 802.11 family of standards on the 5 GHz transmission band and in a frequency range from about 5.85 GHz to 5.95 GHz. The processor 302 may be arranged to inspect the subchannels to detect a Short Training Sequence (STS) portion a data packet on a subchannel of the number of subchannels. The processor 302 may be arranged to apply a coexistence technique for operating on the channel responsive to detecting the STS portion. For example, the processor 302 may refrain from transmitting on the channel.

To separate the signal into a number of subchannels, the user STA 300 may include, within the processor 302, the communications interface 308, or as part of the antenna circuitry 310-1 through 310-N, filters to separate the channel into subchannels with bandwidths of 5 MHz or 10 MHz. The processor 302 may be configured to the processing elements are configured to inspect, in parallel, the output of the filters, for a time duration based on the periodicity of the STS portion, to detect the STS portion as described above with respect to FIG. 2.

In some embodiments, the instructions 314 are stored on the processor 302 or the memory 306 such that the processor 302 and the memory 306 act as computer-readable media. A computer-readable storage device may include any non-transitory mechanism for storing information in a form readable by a machine (e.g., a computer). For example, a computer-readable storage device may include ROM, RAM, magnetic disk storage media, optical storage media, flash-memory devices, and other storage devices and media.

The instructions 314, when executed on the user STA 300, may cause the user STA 300 to separate a signal, received on a wireless communication channel, into a number of subchannels. The instructions 314, when executed on the user STA 300, may cause the user STA 300 to detect a Short Training Sequence (STS) portion of a data packet on a subchannel of the number of subchannels. The instructions 314, when executed on the user STA 300, may cause the user STA 300 to apply a coexistence technique, for example by refraining from transmitting, on the channel responsive to the detecting.

Although the user STA 300 is illustrated as having several separate functional elements, one or more of the functional elements may be combined and may be implemented by combinations of software-configured elements, such as processing elements including digital signal processors (DSPs) and/or other hardware elements. For example, some elements may comprise one or more microprocessors, DSPs, application specific integrated circuits (ASICs), radio-frequency integrated circuits (RFICs), and combinations of various hardware and logic circuitry for performing at least the functions described herein. In some embodiments, the functional elements of the user STA 300 may refer to one or more processes operating on one or more processing elements.

The user STA 300 may include multiple transmit and receive antennas 310-1 through 310-N, where N is a natural number. Antennas 310-1 through 310-N may comprise one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some MIMO embodiments, antennas 310-1 through 310-N may be effectively separated to take advantage of spatial diversity and the different channel characteristics that may result between each of antennas 310-1 through 310-N. In some MIMO embodiments, antennas 310-1 through 310-N may be separated by up to $1/10$ of a wavelength or more. In some embodiments, the antennas 310-1 through 310-N may include bandpass filters or other filtering circuitry to filter a received signal into various subchannels with different bandwidths, for example 5 MHz, 10 MHz, 20 MHz, or other bandwidths.

Figure 4:
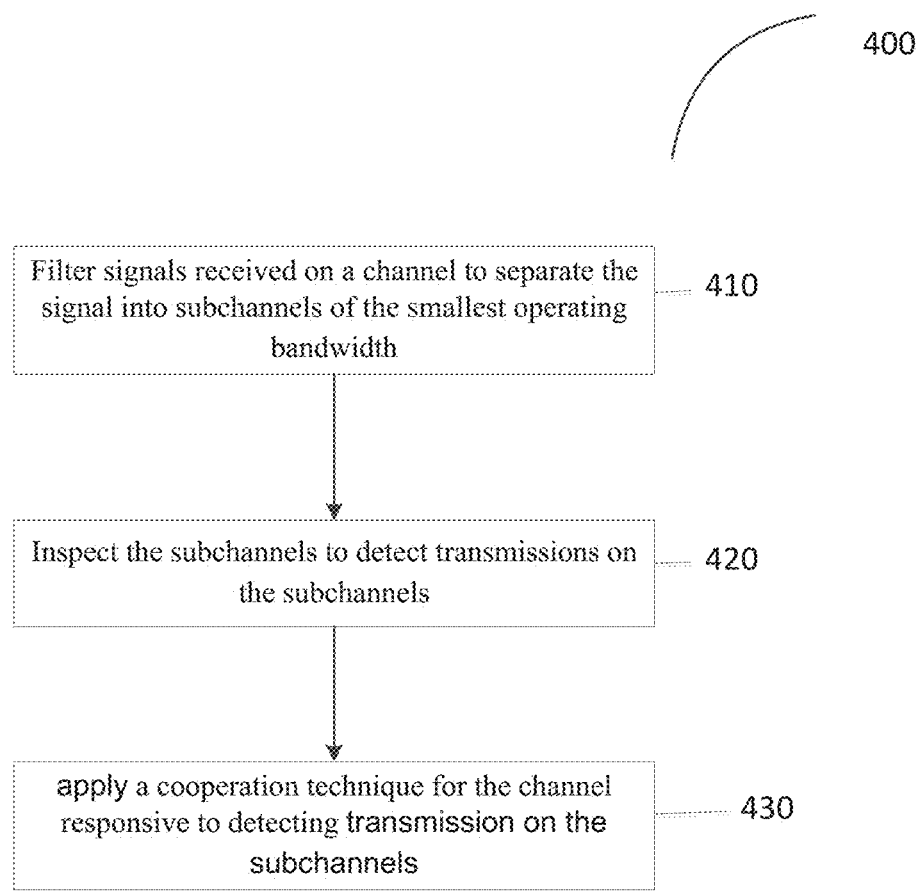
FIG. 4 is a flow diagram of a procedure for cooperating in a wireless network in accordance with some embodiments.

FIG. 4 illustrates a method 400, performed by a user STA 110 with a first range of operating bandwidths, for cooperating in a wireless network with devices with a second range of operating bandwidths. The second range of operating bandwidths may include a smallest operating bandwidth smaller than the operating bandwidths of the first range.

In operation 410, the user STA 110 filters signals received on a channel to separate the signal into subchannels of the smallest operating bandwidth. The user STA 110 may further filter signals received on the channel to separate the signal into another set of subchannels with bandwidths of a next smallest bandwidth of the second range of operating bandwidths. The next smallest bandwidth may be smaller than bandwidths of the first operating bandwidth range.

In operation 420, the user STA 110 inspects the subchannels to detect transmissions on the subchannels. If the user STA 110 further filters signals into a second set of subchannels, the user STA 110 may inspect the first set of subchannels and the second set of subchannels such that, upon detecting a transmission in the second set of subchannels, the user STA 110 terminates the inspection.

In operation 430, the user STA 110 applies a coexistence technique for the channel responsive to detecting transmission on the subchannels.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

OTHER EXAMPLES

The following are illustrative and non-limiting examples.

Example 1 includes subject matter (such as a method, means for performing acts, machine readable medium including instructions) comprising a method performed by a user station (STA), for operating in a wireless network, the method including separating a signal, received on a wireless communication channel, into subchannels; detecting a Short Training Sequence (STS) portion of a data packet on a subchannel of the subchannels; and applying a coexistence technique on the channel, responsive to the detecting, by refraining from transmitting on the channel.

In example 2, the subject matter of example 1 may optionally include, wherein a bandwidth of the subchannels into which the channel is separated is based on an expected bandwidth of transmissions of a device operating on a 5 GHz transmission band, in a frequency range from about 5.85 GHz to 5.925 GHz, in accordance with a standard of the Institute of Electrical and Electronics Engineers (IEEE) 802.11 family of standards.

In example 3, the subject matter of one or more of examples 1-2 may optionally include, wherein the separating includes filtering the signal into subchannels with bandwidths of 5 MHz, and the detecting includes inspecting the subchannels, in parallel, for a time duration based on a periodicity of the STS portion.

In example 4, the subject matter of one or more of examples 1-3 may optionally include, wherein the separating includes filtering the signal into subchannels with bandwidths of 10 MHz, and the detecting includes inspecting the subchannels, in parallel, for a time duration based on a periodicity of the STS portion.

In example 5, the subject matter of example 4 may optionally include, wherein the separating further filters the signal into subchannels with bandwidths of 5 MHz, and the detecting includes inspecting the 10 MHz subchannels in parallel with each other and with the 5 MHz subchannels, and the detecting also includes terminating the inspecting if the inspection of the 10 MHz subchannels detects the STS portion on one of the 10 MHz subchannels.

In example 6, the subject matter of example 5 may optionally include, wherein the separating further filters the signal into a 20 MHz subchannel, and the detecting includes inspecting the 20 MHz subchannel in parallel with the inspecting of the 10 MHz subchannels and the 5 MHz subchannels.

In example 7, the subject matter of one or more of examples 1-6 may optionally include wherein the coexistence technique includes refraining from transmission for a time duration on the channel.

In example 8, the subject matter of example 7 may optionally include wherein the suppressing includes waiting a time duration for silence on the channel.

Example 9 includes or may optionally be combined with the subject matter of any one of examples 1-8 to include subject matter (such as a device, apparatus, or machine) including a wireless communication station (STA) comprising physical layer (PHY) circuitry and processing elements to: receive a signal on a wireless communication channel; separate the signal into a number of subchannels, the number of subchannels being based on an expected bandwidth of transmissions of a device operating in accordance with a standard of the Institute of Electrical and Electronics Engineers (IEEE) 802.11 family of standards on the 5 GHz transmission band and in a frequency range from about 5.85 GHz to 5.95 GHz; inspect the subchannels to detect a Short Training Sequence (STS) portion a data packet on a subchannel of the number of subchannels; and apply a coexistence technique for operating on the channel responsive to detecting the STS portion, the coexistence technique including refraining from transmitting on the channel.

In example 10, the subject matter of any one or more of examples 1-9 may optionally include, wherein the STA is configured to communicate in accordance with a standard of the IEEE 802.11n family of standards or with a standard of the IEEE 802.11ac family of standards.

In example 11, the subject matter of any one or more of examples 1-10 may optionally include, wherein the PHY circuitry and processing elements include filters to separate the channel into subchannels with bandwidths of 5 MHz, or filters to separate the channels into subchannels with bandwidths of 10 MZ, and the processing elements are configured to inspect, in parallel, the output of the filters, for a time duration based on the periodicity of the STS portion, to detect the STS portion.

In example 12, the subject matter of any one or more of examples 1-11 may optionally include, wherein the PHY circuitry and processing elements include a first set of filters to separate the channel into subchannels with bandwidths of 5 MHz and a second set of filters to separate the channel into subchannels with bandwidths of 10 MHz, and the processing elements are configured to inspect the outputs of the first set of filters and second set of filters, in parallel, such that upon detecting the STS portion in an output of the second set of filters, the processor terminates inspection of outputs of the first set of filters.

In example 13, the subject matter of any one or more of examples 1-12 may optionally include, wherein coexistence technique includes suppressing transmission by the user STA on the wideband communication channel for at least a time duration.

Example 14 includes or may optionally be combined with the subject matter of any one of examples 1-13 to include subject matter (such as a method, means for performing acts, machine readable medium including instructions for) comprising, at a device with a first range of operating bandwidths, for cooperating in a wireless network with devices with a second range of operating bandwidths, the second range of operating bandwidths including a smallest operating bandwidth smaller than the operating bandwidths of the first range: filtering signals received on a channel to separate the signal into subchannels of the smallest operating bandwidth; inspecting the subchannels to detect transmissions on the subchannels; and applying, responsive to detecting transmission on the subchannels, a coexistence technique for the channel.

In example 15, the subject matter of one or more of examples 1-14 may optionally include, filtering signals received on the channel to separate the signal into another set of subchannels with bandwidths of a next smallest bandwidth of the second range of operating bandwidths, the next smallest bandwidth being smaller than bandwidths of the first operating bandwidth range; and inspecting the first set of subchannels and the second set of subchannels such that, upon detecting a transmission in the second set of subchannels, the user STA terminates the inspection.

Example 16 includes or may optionally be combined with the subject matter of any one of examples 1-15 to include subject matter (such as a device, apparatus, or machine) comprising a system comprising: an antenna configured to receive a signal on a wireless communication channel; and one or more processors configured to: separate the signal into a number of subchannels, the number of subchannels being based on an expected bandwidth of transmissions of a device operating in accordance with a standard of the Institute of Electrical and Electronics Engineers (IEEE) 802.11 family of standards on the 5 GHz transmission band and in a frequency range from about 5.85 GHz to 5.95 GHz; and inspect the subchannels to detect a Short Training Sequence (STS) portion of a data packet on a subchannel of the number of subchannels.

In example 17, the subject matter of one or more of examples 1-16 may optionally include, wherein the one or more processors are configured to apply coexistence techniques on the channel responsive to detecting the STS portion on the subchannel by suppressing STA transmissions on the channel for at least a time duration.

Example 18 includes or may optionally be combined with the subject matter of any one of examples 1-17 to include subject matter (such as a method, means for performing acts, machine readable medium including instructions) comprising: separating a signal, received on a wireless communication channel, into a number of subchannels; detecting a Short Training Sequence (STS) portion of a data packet on a subchannel of the number of subchannels; and applying a coexistence technique on the channel responsive to the detecting, the coexistence technique including refraining from transmitting on the channel.

In example 19, the subject matter of one or more of examples 1-18 may optionally include, wherein a bandwidth of the subchannels is a smallest operating bandwidth of a device operating in accordance with a standard of the Institute of Electrical and Electronics Engineers (IEEE)

802.11 family of standards on a 5 GHz transmission band and in a frequency range from about 5.85 GHz to 5.95 GHz.

In example 20, the subject matter of one or more of examples 1-19 may optionally include, wherein another bandwidth of the subchannels is a next smallest operating bandwidth of the device.

What is claimed is:

1. A method, performed by a user station (STA), for operating in a wireless network, the method comprising:
separating a signal, received on a wireless communication channel in a frequency spectrum comprising 5 GHz, into subchannels, wherein a bandwidth of the subchannels into which the channel is separated is based on an expected bandwidth of transmissions of a device operating on a 5 GHz transmission band, on a frequency ranging from 5.85 GHz to 5.925GHz, in accordance with a standard of the Institute of Electrical and Electronics Engineers (IEEE) 802.11 family of standards;
detecting a Short Training Sequence (STS) portion of a data packet on a subchannel of the subchannels, wherein
the separating includes filtering the signal into subchannels with bandwidths of 10 MHz and into subchannels with bandwidths of 5 MHz, and
the detecting includes inspecting the 10 MHz subchannels, in parallel with each other, and the 5MHz subchannels in parallel with each other for a time duration based on a periodicity of the STS portion, and terminating the inspecting if the inspection of the 10 MHz subchannels detects the STS portion on one of the 10 MHz subchannels; and
applying a coexistence technique on the channel, responsive to the detecting, by refraining from transmitting on the channel.

2. The method of claim 1, wherein
the separating includes filtering the signal into subchannels with bandwidths of 5 MHz, and
the detecting includes inspecting the subchannels, in parallel, for a time duration based on a periodicity of the STS portion.

3. The method of claim 1, wherein
the separating further filters the signal into a 20 MHz subchannel, and
the detecting includes inspecting the 20 MHz subchannel in parallel with the inspecting of the 10 MHz subchannels and the 5 MHz subchannels.

4. The method of claim 1, wherein the coexistence technique includes refraining from transmission for a time duration on the wideband communication channel.

5. The method of claim 4, wherein the suppressing includes waiting a time duration for silence on the channel.

6. A wireless communication station (STA) comprising:
physical layer (PHY) circuitry configured to:
receive a signal on a wireless communication channel in a frequency spectrum comprising 5 GHz; and
processing elements to:
separate the signal into a number of subchannels, the number of subchannels being based on an expected bandwidth of transmissions of a device operating in accordance with a standard of the Institute of Electrical and Electronics Engineers (IEEE) 802.11 family of standards on the 5 GHz transmission band and on a frequency ranging from 5.85 GHz to 5.95 GHz;
inspect the subchannels to detect a Short Training Sequence (STS) portion a data packet on a subchannel of the number of subchannels; and
wherein the PHY circuitry is further configured to: apply a coexistence technique for operating on the channel responsive to detecting the STS portion, the coexistence technique including refraining from transmitting on the channel, wherein the STA is configured to communicate in accordance with a standard of the IEEE 802.11n family of standards or with a standard of the IEEE 802.11ac family of standards,
wherein the PHY circuitry and processing elements include a first set of filters to separate the channel into subchannels with bandwidths of 5 MHz and a second set of filters to separate the channel into subchannels with bandwidths of 10 MHz, and
the processing elements are configured to inspect the outputs of the first set of filters and second set of filters, in parallel, such that upon detecting the STS portion in an output of the second set of filters, the processor terminates inspection of outputs of the first set of filters.

7. The user STA of claim 6, wherein the PHY circuitry and processing elements include
filters to separate the channel into subchannels with bandwidths of 5 MHz, or
filters to separate the channel into subchannels with bandwidths of 10 MHz, and
the processing elements are configured to inspect, in parallel, the output of the filters, for a time duration based on the periodicity of the STS portion, to detect the STS portion.

8. The user STA of claim 6, wherein the coexistence technique includes suppressing transmission by the user STA on the wideband communication channel for at least a time duration.

9. A method, performed by a device with a first range of operating bandwidths, for cooperating in a wireless network with devices with a second range of operating bandwidths, the second range of operating bandwidths including a smallest operating bandwidth smaller than the operating bandwidths of the first range, the method comprising:
filtering signals received on a channel to separate the signal into subchannels of the smallest operating bandwidth;
inspecting the subchannels to detect transmissions on the subchannels;
applying, responsive to detecting transmission on the subchannels, a cooperation technique for the channel;
filtering signals received on the channel to separate the signal into another set of subchannels with bandwidths of a next smallest bandwidth of the second range of operating bandwidths, the next smallest bandwidth being smaller than bandwidths of the first operating bandwidth range; and
inspecting the first set of subchannels and the second set of subchannels such that, upon detecting a transmission in the second set of subchannels, the user STA terminates the inspection.

10. A system comprising:
an antenna configured to receive a signal on a wireless communication channel in a frequency spectrum comprising 5 GHz; and
one or more processors configured to
separate the signal into a number of subchannels, the number of subchannels being based on an expected bandwidth of transmissions of a device operating in accordance with a standard of the Institute of Electrical and Electronics Engineers (IEEE)802.11 family of standards on the 5 GHz transmission band and on a frequency ranging from 5.85 GHz to 5.95 GHz;

inspect the subchannels to detect a Short Training Sequence (STS) portion of a data packet on a subchannel of the number of subchannels;

filter signals received on the wireless communication channel to separate the signal into another set of subchannels with bandwidths of a next smallest bandwidth of the second range of operating bandwidths, the next smallest bandwidth being smaller than bandwidths of the first operating bandwidth range; and inspecting the first set of subchannels and the second set of subchannels such that, upon detecting a transmission in the second set of subchannels, the user STA terminates the inspection.

11. The system of claim 10, wherein the one or more processors are configured to apply coexistence techniques on the channel responsive to detecting the STS portion on the subchannel by suppressing STA transmissions on the channel for at least a time duration.

12. A non-transitory computer-readable storage medium that stores instructions for execution by one or more processors to perform operations comprising:

separating a signal, received on a wireless communication channel in a frequency spectrum comprising 5 GHz, into a number of subchannels, the number of subchannels being based on an expected bandwidth of transmissions of a device operating in accordance with a standard of the Institute of Electrical and Electronics Engineers (IEEE) 802.11 family of standards on the 5 GHz transmission band and on a frequency ranging from 5.85 GHz to 5.95 GHz;

detecting a Short Training Sequence (STS) portion of a data packet on a subchannel of the number of subchannels;

applying a coexistence technique on the channel responsive to the detecting, the coexistence technique including refraining from transmitting on the channel; and using a first set of filters to separate the channel into subchannels with bandwidths of 5 MHz and a second set of filters to separate the channel into subchannels with bandwidths of 10 MHz, and inspecting the outputs of the first set of filters and second set of filters, in parallel, such that upon detecting the STS portion in an output of the second set of filters, the processor terminates inspection of outputs of the first set of filters.

13. The non-transitory computer-readable storage medium of claim 12, wherein a bandwidth of the subchannels is a smallest operating bandwidth of a device operating in accordance with a standard of the Institute of Electrical and Electronics Engineers (IEEE) 802.11 family of standards on a 5 GHz transmission band and on a frequency of 5.85 GHz to 5.95 GHz.

14. The non-transitory computer-readable storage medium of claim 13, wherein another bandwidth of the subchannels is a next smallest operating bandwidth of the device.

* * * * *